United States Patent [19]
Knop

[11] 3,766,793
[45] Oct. 23, 1973

[54] TRANSMISSION SHIFT CONTROLS
[75] Inventor: Donald F. Knop, Spencerport, N.Y.
[73] Assignee: General Motors Corporation, Detroit, Mich.
[22] Filed: Aug. 15, 1972
[21] Appl. No.: 280,794

[52] U.S. Cl. .............................................. 74/335
[51] Int. Cl. .............................................. F16h 5/06
[58] Field of Search ...................... 74/335; 192/359

[56] References Cited
UNITED STATES PATENTS
2,073,108   3/1937   Kesling ................................. 74/335
2,152,914   4/1939   Price et al. ............................ 74/335
2,339,697   1/1944   Heg ...................................... 74/335
2,655,042   10/1953  Almond ................................ 74/335

Primary Examiner—Arthur T. McKeon
Attorney—W. E. Finken et al.

[57] ABSTRACT

A transmission shift control unit with power assist which incorporates a vacuum control valve that is selectively moved to different positions by manual actuation of a drive range selector. Vacuum control valve movement triggers power piston movement to different stations to power shift the transmission into selected forward drive operating ranges, reverse, neutral or park. If no vacuum is available the transmission can be manually shifted into any operating range utilizing components of the unit as a mechanical linkage system.

5 Claims, 1 Drawing Figure

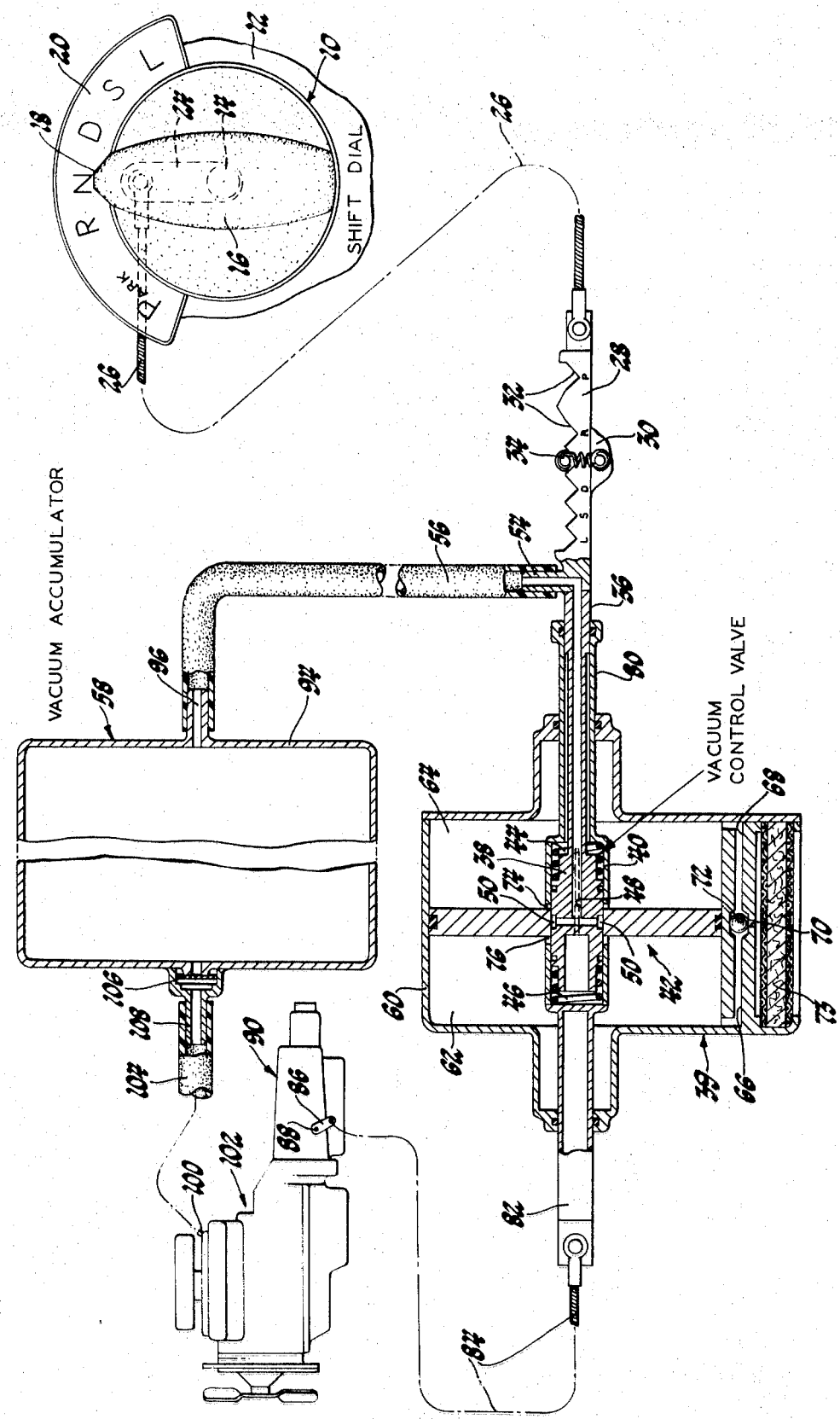

TRANSMISSION SHIFT CONTROLS

This invention relates to transmission shift controls and more particularly to a shift control unit with power assist incorporating a power piston whose powered movement to predetermined stations to change transmission operation is triggered by selective movement of a manually shifted control valve.

Driver selection of a transmission operations has generally been through an articulated mechanical linkage system operatively connecting a manual selector lever to the transmission. While these linkage systems are highly reliable and have excellent service life, they usually require actuation by a long lever arm provided by a manual lever mounted on the steering column or in a floor console adjacent the vehicle operator. The articulated linkages connecting the manual lever and the transmission further requires considerable space within the vehicle power package compartment. Such linkages are also fairly inaccessible for lubrication, adjustment and other maintenance purposes.

Prior power assist transmission control units for transmissions have usually employed complex controls operatively disposed within the transmission housing modified to accommodate the controls. Furthermore, many of these control units could not be used to mechanically shift the transmission in the event of power failure.

This invention features the powered selection of different operations of either automatic or manual transmission. This unit is separated from the transmission and provides for smoother shifting. This unit diminishes vehicle operator effort in controlling the transmission thus providing important benefits to operators including many operators with physical handicaps. In this invention vacuum developed by the engine is employed to effect power piston movement to different stations as determined by the selected position of a vacuum control valve manually moved by a vehicle operator to change transmission operation. A vacuum accumulator is employed to provide for power shifting even when the engine is not running and developing a vacuum. In the event that vacuum is not available for power shifting, this invention utilizing the power shift components provides a direct mechanical connection between the manually operated selector and the transmission so that the transmission can be manually shifted to any of the various operations available.

With this invention the prior art mechanical linkage including the manual selector lever is eliminated and replaced by a knob or other suitable selector operatively connected by cable means to the power unit and to the transmission. This provides for improved control over the transmission and a greater choice in location of the manual control to enhance interior design possibilities. The power portion of this transmission unit can be located in various positions within the vehicle such as in the passenger compartment for quick access, in available space within the engine compartment or on the transmission itself.

In addition to the above it is a feature, object and advantage of this invention to provide a new and improved transmission shift control unit incorporating a power piston for power assist shifting of a transmission to various operations and incorporating mechanical means for all manual shifting in the event that power assist is not available.

Another feature, object and advantage of this invention is to provide a new and improved vacuum actuated power piston separated from a transmission selectively moved to different stations by a control valve positioned by the vehicle operator to power shift the transmission into any of its operating ranges.

These and other objects, advantages and features of this invention will be more apparent from the following detailed description and drawing in which:

The FIGURE is a diagrammatic view of a transmission control unit.

As shown in the FIGURE there is an operating range selector dial 10 for an automatic transmission mounted for turning movement on a support panel 12 by a shaft 14. The dial 10 has a knob 16 that terminates in a pointer 18 which sweeps across a fixed operating range selector quadrant 20 when the knob is manually grasped and turned by the vehicle operator. The quadrant is secured to the support panel 12 and has appropriate lettering P, R, N, D, S, L corresponding to the various transmission operations: Park, Reverse, Neutral, Automatic Change Speed Drive, Second and Low, respectively.

The shaft 14, rotatably mounted in panel 12, has a lower arm 24 fixed thereto which turns with the knob 16. Secured to an outer portion of arm 24 is one end of an elongated cable 26 that has its other end secured to the end of a longitudinally shiftable selector rod 28 mounted for sliding movement in a support bracket 30. One of the sides of the selector rod 28 is provided with a series of detent notches 32 corresponding to the transmission operating ranges P, R, N, D, S, L that are selectively engaged by a spring biased detent roller 34 to hold the selector rod in any one of its shifted positions. The range selector rod 28 is secured to a tubular connector 36 extending from a cylindrical control valve element 38 of a power unit 39. This valve element is slidably mounted in a central cylindrical portion or cylinder 40 of a power piston 42 of the power unit and is biased to a central position within cylinder 40 by opposing springs 44 and 46 which are trapped by the valve element in opposite ends of cylinder 40. The valve element 38 is formed with an elongated passage 48 leading from transversely located ports 50 formed in the periphery of the valve element 38. This passage extends through the connector 36 and continues into a tubular fitting 54 secured into the end of the connector 36. An elastomeric flexible tube 56 is disposed on fitting 54 and continues the passage into a vacuum accumulator 58 which will be later described.

The power piston 42 is mounted for sliding movement in a housing 60 of the power unit 39 and separates this housing into two chambers 62 and 64. The housing has passages 66 and 68 formed in one wall leading from chambers 62 and 64 respectively to an air intake port 70. A dual action ball valve 72 is operatively disposed at the junction of passages 66 and 68 and intake port 70 and moves to block passage 66 when chamber 62 is connected to a vacuum source and moves to block passage 68 when chamber 64 is connected to vacuum. A suitable air filter 73 is mounted in housing 60 over intake port 70 to prevent foreign matter from entering the housing.

The power piston is provided with spaced vacuum ports 74 and 76 in cylinder 40 on either side of the piston which can be aligned with the transverse ports 50 in the valve 38 during power assist operation as will be later explained. Extending axially from opposite sides of the cylinder 40 of the power piston are tubular extensions 80 and 82 that are slidably mounted in power unit housing 60. The tubular extension 80 slidably supports the connector 36 therein.

The tubular extension 82 is connected to one end of an elongated cable 84. The other end of this cable is connected to a selector lever 86 that is supported by a transmission selector shaft 88 mounted for limited turning movement to different predetermined positions in an automatic transmission 90 to change the transmission operating ranges.

The vacuum accumulator 58 comprises a sealed hollow housing 94 that has a hose fitting 96 for receiving the end of the flexible tube 56 so that passage 48 in the control valve element 38 communicates with the interior of the vacuum accumulator. The interior of the vacuum accumulator is connected to a vacuum source such as the air intake manifold 100 of an internal combustion engine 102 by a flexible tube 104. A one-way valve 106 operatively disposed in a fitting 108 opens when the engine is operating to establish a vacuum in the accumulator, passage 48 and in one of the two chambers in the power unit. When the engine is shut down, the valve 106 closes so that a negative pressure is maintained in the accumulator for operating the power piston and thereby providing a powered selection of different transmission operating ranges without engine operation.

Power assisted transmission range selection is made by manually moving the knob 16 to any selected transmission operation indicated by pointer 18. For example, by turning knob 16 from neutral N to low range L, cable 26 is pulled to linearly move valve 38 a predetermined distance to the right so that detent 34 engages notch 32 corresponding to the low range drive position L.

As the valve 38 moves toward its low range position, spring 44 is compressed and ports 50 in the valve 38 come into alignment with port 74 in the power piston. With this port alignment, chamber 64 is connected to the vacuum accumulator 58 and to the air intake manifold 100. If the engine 102 is not operating vacuum accumulator valve 106 closes so that the vacuum accumulator provides the vacuum source. With the chamber 64 connected to the vacuum source there is a pressure drop in chamber 64 causing ball valve 72 to seal passage 68 so that chamber 64 and the vacuum accumulator have the same negative pressure. With chamber 62 open to atmosphere via air intake port 70 and passage 66, the force exerted by atmospheric pressure on the power piston 42 moves the power piston to the right as the valve 38 is moved by cable 26. This action of the power piston pulls the cable 84 and turns the selector shaft clockwise to change the transmission operation. When the movement of valve 38 is terminated positive pressure in chamber 62 continues to move the power piston to the right causing the sealing of vacuum port 50. This cuts off the chamber 64 from the vacuum accumulator chamber 58 and the air intake manifold. When this occurs the ball valve 72 falls away from the valve seat leading into passage 68 so that this passage connects chamber 64 to the atmosphere via port 70. With atmospheric pressure in chamber 64 the pneumatic forces on piston 42 are equalized allowing spring 44 to expand to move the power piston further to the right relative to the valve element to center the valve element in its normal position relative to the power piston. With this full movement of the power piston from its neutral position to the low range position, the selector shaft lever and connected selector shaft are turned to condition the transmission for low range drive.

From the low range drive the transmission may be shifted to select any of the other operating ranges by turning knob 16 counterclockwise. For example, in a shift from low L to automatic drive D, the cable 26 is pushed by the knob 16 to move valve 38 from the low position to an automatic drive position. During this movement the vacuum ports 50 will become aligned with the ports 76 of the power piston and the pressure in chamber 62 becomes negative with ball valve 72 sealing air intake passage 66. The power piston follows the movement of the valve to the automatic drive position by the force exerted on the power piston by atmospheric pressure in chamber 64. After the valve 38 reaches the selected location, the atmospheric pressure in chamber 64 continues the leftward movement of the power piston until port 76 is blocked. The chamber 62 then becomes cut off from the vacuum accumulator and the ball valve 72 falls away from the passage 66 so that chamber 62 is pressurized by atmospheric pressure. With atmospheric pressure in both chambers 62 and 64, the spring 46 continues the leftward movement of piston 42 until the valve 38 is centered relative to the power piston. When the power piston is so centered the selector shaft is turned to its drive range position. The detent notch corresponding with automatic change speed forward drive and the transmission is in its selected operation condition.

The other transmission operating ranges can be selected utilizing the power assist by turning the control knob to selected position to effect evacuation of chamber 62 or 64 as described above so that further description is not needed.

In the enent that no vacuum is available, the transmission can be shifted manually to any operation. As the knob 16 is turned to its desired position the motion is transferred from the knob to the vacuum control valve 38 which bottoms in the power piston and the power piston can move in the desired direction. Thus when the knob is turned to the right and the range selector rod is pulled the power piston will be mechanically moved to the right to the desired position when the valve element bottoms in the power piston. As the knob 16 reaches the desired position the motion is relaxed from the knob to the vacuum control valve and the power piston stops so that the transmission operation is changed by the mechanical motion transmitted through the valve to the power piston and cable 84 to the selector shaft lever 86 and the selector shaft 88.

While a preferred embodiment of this invention has been shown and described, other embodiments will be now readily apparent to those skilled in the art. This invention is therefore not limited to that which has been shown and described but only by the following claims:

I claim:

1. In a control for a change-speed transmission driven by an engine, a power unit disposed outside of said transmission for power shifting said transmission, said power unit comprising a housing, piston means mounted for movement in said housing and dividing said housing into separate chambers, connector means operatively connecting said piston means to said transmission, a vacuum source, valve means operatively connected to said vacuum source and to said piston means, manually operable selector means, support means supporting said selector means for movement to a plurality of different stations corresponding to the different operations of said transmission, means operatively connecting said selector means to said valve means so that movement of said selector means to any one of said stations moves said valve means toward a predetermined corresponding station establishing a vacuum in one of said chambers causing said piston means to move to a position to shift said transmission.

2. In a control for a transmission having a plurality of different operating ranges, a power unit for power assist shifting of the transmission to any of the different operating ranges, said power unit comprising a housing separate from said transmission and fluid-actuated piston means operatively disposed in said housing, force transmitting means operatively connecting said piston means to said transmission, a source of fluid pressure, valve means movable to different positions with respect to said piston means to permit pressure from said source to move said piston means to different predetermined positions to thereby power select different predetermined transmission operating ranges, manual selector means operatively connected to said valve means for moving said valve means to said different positions, and force transmitting contact means for drivingly connecting said valve means to said piston means to permit said selector means to mechanically move said piston means in said housing to thereby mechanically select different transmission operating ranges.

3. In a control for a transmission having a plurality of different operating ranges, a power unit operatively connected to said transmission for selecting any one of the transmission operating ranges, said power unit comprising a housing, a piston means mounted for movement in said housing and dividing said housing into separate chambers, an air intake for said chambers, first and second air passages pneumatically connecting said air intake to said chambers, first valve means for selectively blocking either of said air passages, second valve means mounted for movement in said piston, a vacuum source, passage means in said valve means for pneumatically connecting either of said chambers to said vacuum source, connector means operatively connecting said piston means to said transmission, manually operable selector means for selecting different transmission operating ranges, support means supporting said selector means for movement to a plurality of different stations corresponding to the different operating ranges of said transmission, connector means operatively connecting said selector means and said second valve means so that movement of said selector means moves said second valve means relative to said piston means to effect the connection of one of said chambers to said vacuum source so that pressure in the other of said chambers moves said piston means to a position to change the transmission operating range determined by the position of said second valve means in which said vacuum source is sealed from communication with either of said chambers.

4. The control of claim 3, said second valve means having contact means for direct engagement with said piston means to mechanically move said piston means in either direction to mechanically change the operating range of said transmission in response to movement of said selector when no vacuum is available for said chambers.

5. The control of claim 3 wherein said piston means has a cylindrical sleeve for housing said second valve means, first and second port means in said sleeve on opposite side of said piston means, passage means in said second valve means communicating with said vacuum source, port means in said second valve means leading to said last mentioned passage means for selective communication with either said first or second port means for reducing the pressure in either of said chambers.

* * * * *